ň US012131320B2

(12) United States Patent
Young

(10) Patent No.: US 12,131,320 B2
(45) Date of Patent: Oct. 29, 2024

(54) METHODS AND SYSTEMS FOR IMPLEMENTING AN OMNI-CHAIN INTEROPERABILITY PROTOCOL IN AN OMNI-CHAIN NETWORK

(71) Applicant: ANALOG ONE CORPORATION, Middletown, DE (US)

(72) Inventor: Victor Young, San Francisco, CA (US)

(73) Assignee: ANALOG ONE CORPORATION, Middletown, DE (US)

( * ) Notice: Subject to any disclaimer, the term of this patent is extended or adjusted under 35 U.S.C. 154(b) by 0 days.

(21) Appl. No.: 18/051,865

(22) Filed: Nov. 1, 2022

(65) Prior Publication Data

US 2024/0144257 A1 May 2, 2024

(51) Int. Cl.
*G06Q 20/38* (2012.01)
*G06Q 20/02* (2012.01)

(52) U.S. Cl.
CPC ......... *G06Q 20/3829* (2013.01); *G06Q 20/02* (2013.01); *G06Q 20/3825* (2013.01)

(58) Field of Classification Search
CPC ............... G06Q 20/3829; G06Q 20/02; G06Q 20/3825; H04L 9/3239; H04L 9/50
See application file for complete search history.

(56) References Cited

U.S. PATENT DOCUMENTS

| 10,764,258 | B2 | 9/2020 | Gleichauf | |
|---|---|---|---|---|
| 10,901,983 | B2 | 1/2021 | Zhang et al. | |
| 11,379,832 | B2* | 7/2022 | Austin | G06Q 20/3821 |

(Continued)

FOREIGN PATENT DOCUMENTS

| CN | 110993044 A | * | 4/2020 | ......... G06F 21/6245 |
|---|---|---|---|---|
| CN | 115051808 A | * | 9/2022 | |

(Continued)

OTHER PUBLICATIONS

Longze Wang, Dynamic Adaptive Cross-Chain Trading Mode for multi-Microgrid Joint Operation, Oct. 2020, Sensors (Year: 2020).*

(Continued)

*Primary Examiner* — Neha Patel
*Assistant Examiner* — Chunling Ding
(74) *Attorney, Agent, or Firm* — Evergreen Valley Law Group; Kanika Radhakrishnan

(57) ABSTRACT

Methods and systems for omni-chain interoperability protocol in omni-chain network is disclosed. The method includes receiving by a first node, an event data from a first blockchain. The method includes attesting the event data based on a Threshold Signature Schemes (TSS) process. The method includes transmitting the attested event data to time nodes on a timechain. Upon receiving the attested event data, the time nodes validate the attested event data. The validated event data is available for a second node on a second blockchain to access. The second node is configured to access the validated event data from timechain, attest the validated event data along with other nodes on the second blockchain, and deploy a second smart contract on the second blockchain. The second smart contract completes a transmission of the validated event data as an ongoing transaction from the first blockchain to the second blockchain.

9 Claims, 9 Drawing Sheets

(56) References Cited

U.S. PATENT DOCUMENTS

| | | | | |
|---|---|---|---|---|
| 2019/0253422 | A1* | 8/2019 | Treat | G06Q 20/223 |
| 2019/0287200 | A1* | 9/2019 | Schuler | G06Q 50/265 |
| 2020/0082126 | A1* | 3/2020 | Brown | G06Q 20/401 |
| 2020/0322175 | A1* | 10/2020 | Chen | H04L 9/3066 |
| 2020/0349564 | A1* | 11/2020 | Padmanabhan | G06F 16/1824 |
| 2020/0374113 | A1* | 11/2020 | Noam | H04L 9/0637 |
| 2022/0094555 | A1* | 3/2022 | Roy | G06Q 20/065 |
| 2023/0259930 | A1* | 8/2023 | Liu | G06Q 20/401 705/75 |
| 2023/0269092 | A1* | 8/2023 | Camenisch | H04L 9/3247 713/176 |
| 2023/0289337 | A1* | 9/2023 | Zarick | G06Q 20/403 |
| 2024/0137231 | A1* | 4/2024 | Zhu | H04L 9/50 |

FOREIGN PATENT DOCUMENTS

| | | | | |
|---|---|---|---|---|
| WO | WO-2018232494 A1 * | 12/2018 | | G06Q 40/04 |
| WO | WO-2022212801 A2 * | 10/2022 | | G06Q 20/065 |

OTHER PUBLICATIONS

Longze Wang, Dynamic Adaptive Cross-Chain Trading Mode for Multi-Microgrid Joint Operation, Oct. 2020, https://www.ncbi.nlm.nih.gov/pmc/articles/PMC7662539/pdf/sensors-20-06096.pdf (Year: 2020).*

Gang Want, Inter Trust: Towards an Efficient Blockchain Interoperability Architecture with Trusted Services, 2021, https://ieeexplore.ieee.org/stamp/stamp.jsp?tp=&arnumber=9680593 (Year: 2021).*

Fran Casino, Thomas K. Dasaklis, Constantinos Patsakis, A systematic literature review of blockchain-based applications: Current status, classification and open issues, Dec. 28, 2018, Telematics and Informatics vol. 36, Mar. 2019, pp. 55-81, Greece.

Thomas Hardjono, Alexander Lipton, Alex Pentland, Towards an Interoperability Architecture for Blockchain Autonomous Systems, IEEE Trans. Engineering Management Special Issue: Blockchain Ecosystem, The United States of America.

* cited by examiner

METHODS AND SYSTEMS FOR IMPLEMENTING AN OMNI-CHAIN INTEROPERABILITY PROTOCOL IN AN OMNI-CHAIN NETWORK

TECHNICAL FIELD

The present disclosure relates to an interoperable blockchain architecture and, more particularly to methods and systems for implementing an omni-chain interoperability protocol in an omni-chain network that allows two relatively independent blockchains to communicate.

BACKGROUND

Various decentralized apps (dApps) enable users to perform certain financial tasks such as purchasing goods and services, purchasing non-fungible tokens (NFTs), transferring digital assets from one digital wallet to another, staking tokens in liquidity pools (LPs) across many chains to optimize earnings, and the like. Irrespective of the level of complexity of these financial tasks, every action that the user undertakes constitutes event data. The term 'event data' refers to any data that describes which activity is being performed by the subscribers (i.e., users) in a network (such as a blockchain network) at a specific time. In other words, event data may be described as an indicator of the occurrence of any particular event in the network.

Typically, different dApps may operate on different blockchain networks e.g., Bitcoin™ blockchain and Ethereum™ blockchain. In such a scenario, leveraging the event data for cross-chain communication is not possible due to a lack of cross-platform support between different networks. The inability of conventional blockchain architectures to share event data across different networks or ecosystems has led to inefficient systems.

To address this issue, various approaches have been determined. One such approach is a pairwise bridge approach that includes bridges that allow crypto assets to be locked or burned on one chain and an identical asset to be unlocked or minted on the destination chain. In this approach, the user has to manually convert the wrapped asset to access a native token on the destination chain. This process is resource intensive and often at excessive fees. Further, this approach is not only centralized and also requires substantial engineering efforts to scale, especially when connected protocols change or new ones emerge.

Another approach for addressing this issue includes the use of oracles. Oracles are off-chain nodes that provide an intermediary layer between real-world data and on-chain smart contracts. However, since oracles are off-chain, they primarily serve as trustworthy nodes, which centralizes the system. Additionally, since Oracles are data source independent, real data sources are not considered in the interoperability process, which is undesirable.

Yet another approach for addressing this issue includes using sidechains and hubs. Under this framework, sidechains (which can be sovereign chains) operate largely as layer-2 protocols that are compatible with a hub. For example, Cosmos™ and Polkadot™ are two major protocols that use this model to offer interoperability. However, this infrastructure largely promotes centralization because users cannot seamlessly transfer assets outside of their ecosystems. Further, sidechains are also limited by the Proof-of-Stake (PoS) consensus, which can be sluggish with significant barriers to entry for validators.

Hence, there exists a technological need for more efficient methods and systems for providing an interoperability infrastructure that can address the above-mentioned issues. As the number of blockchain networks increases, so does the need to provide omni-chain communication between blockchain networks.

SUMMARY

Various embodiments of the present disclosure provide methods and systems for allowing multiple heterogeneous blockchains to communicate.

In an embodiment, a computer-implemented method is disclosed. The computer-implemented method includes receiving an event data from a first blockchain, wherein the event data includes information related to a first smart contract. The method includes attesting the event data based at least on a Threshold Signature Schemes (TSS) process. Further, the method includes transmitting the attested event data to time nodes on a timechain. The validated event data is available for a second node on a second blockchain of the omni-chain network to access. The second node on the second blockchain is configured to access the validated event data from the timechain. The second node is also configured to attest the validated event data along with other nodes on the second blockchain, based at least on the TSS process. The second node is further configured to deploy a second smart contract on the second blockchain, wherein the second smart contract completes a transmission of the validated event data as an ongoing transaction from the first blockchain to the second blockchain.

In another embodiment, a computer-implemented method is disclosed. The computer-implemented method includes receiving an attested event data from nodes on a first blockchain of the omni-chain network. Further, the method includes determining a count of one or more nodes on the first blockchain involved in attesting an event data based at least on the attested event data. The method further includes validating the attested event data based at least in part, on a Proof-of-Time (PoT) consensus process, upon determining the count of the one or more nodes matching the predefined criterion. The method further includes appending the validated event data on the timechain as a new block, upon validation of the attested event data.

In yet another embodiment, a first node for implementing an omni-chain protocol for enabling interoperability between heterogeneous blockchains in an omni-chain network is provided. The first node includes a memory configured to store instructions, a communication interface, and a processor in communication with the memory and the communication interface. The processor is configured to execute the instructions stored in the memory and thereby cause the first node to perform at least in part to receive an event data from the first blockchain, wherein the event data includes information related to a first smart contract. The first node is further caused to attest the event data based at least on a Threshold Signature Schemes (TSS) process, along with other nodes on the first blockchain. The first node is also caused to transmit the attested event data to time nodes on a timechain. The time nodes validate the attested event data on the timechain. The validated event data is available for a second node on a second blockchain of the omni-chain network to access. The second node on the second blockchain is configured to access the validated event data from the timechain. The second node is further configured to attest the validated event data along with other nodes on the second blockchain, based at least on the TSS process. The second node is also configured to deploy a second smart contract on the second blockchain, wherein the second smart contract completes a transmission of the validated event data as an ongoing transaction from the first blockchain to the second blockchain.

In yet another embodiment, a time node for implementing a decentralized consensus process in an omni-chain network is provided. The time node includes a memory configured to store instructions, a communication interface, and a processor in communication with the memory and the communication interface. The processor is configured to execute the instructions stored in the memory and thereby cause the time node to perform at least in part to receive an attested event data from a first node on a first blockchain of the omni-chain network, the attested event data to be transmitted as a transaction from the first blockchain to a second blockchain. The time node is further caused to determine a count of one or more nodes on the first blockchain involved in attesting an event data based at least on the attested event data. Further, the time node is caused to upon determining the count of the one or more nodes matching the predefined criterion, validate the attested event data based at least in part, on a Proof-of-Time (PoT) consensus process. Furthermore, the time node is caused to upon validation of the attested event data, append the validated event data on the timechain as a new block.

BRIEF DESCRIPTION OF THE FIGURES

For a more complete understanding of example embodiments of the present technology, reference is now made to the following descriptions taken in connection with the accompanying drawings in which.

DETAILED DESCRIPTION

Figure 1:
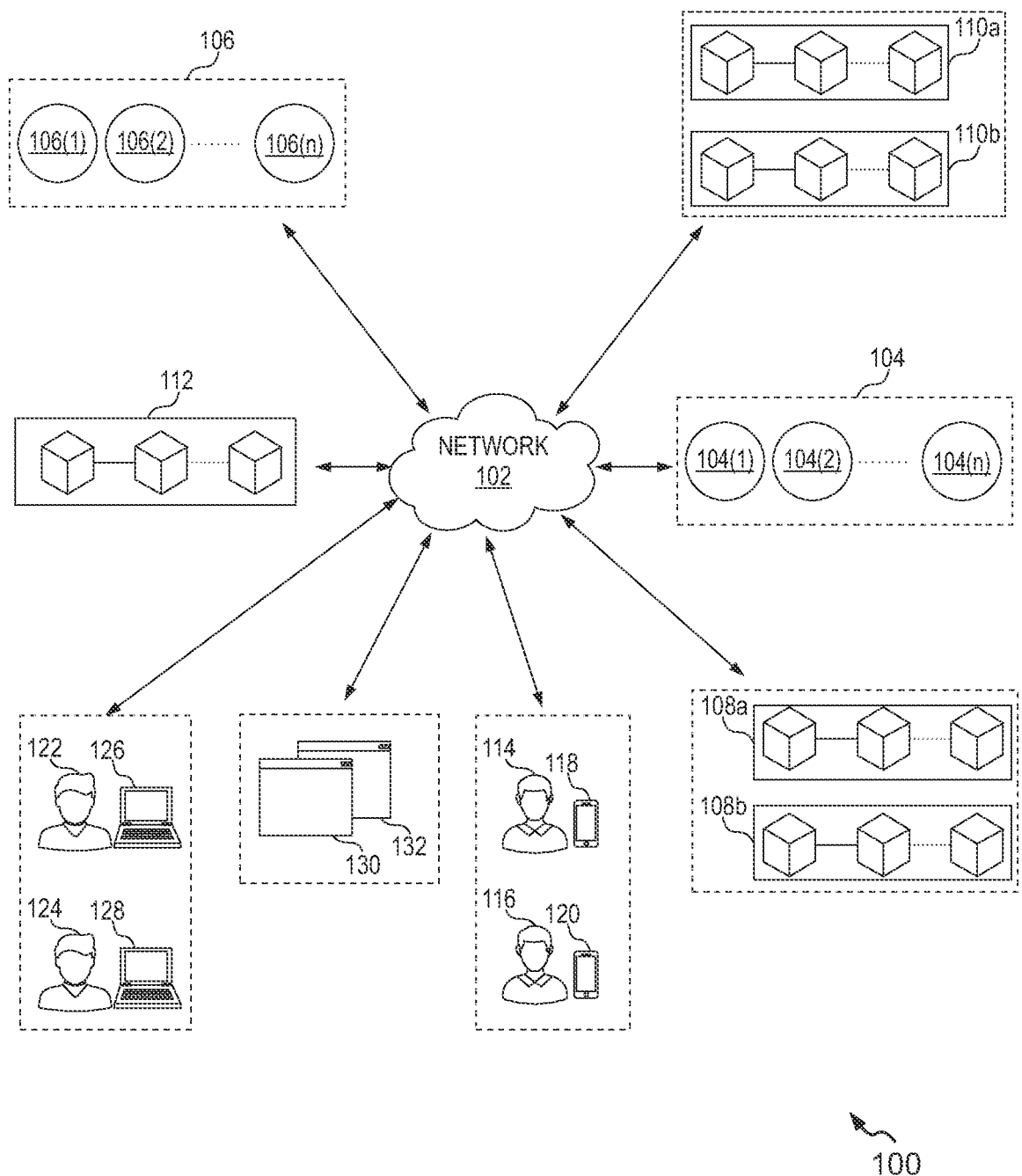
FIG. 1 is an example representation of an environment related to at least some examples of the present disclosure.

In the following description, for purposes of explanation, numerous specific details are set forth in order to provide a thorough understanding of the present disclosure. It will be apparent, however, to one skilled in the art that the present disclosure can be practiced without these specific details. In other instances, systems and methods are shown in block diagram form only in order to avoid obscuring the present disclosure. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Reference in this specification to "one embodiment", "an embodiment", "one example", "an example", "one implementation" or "an implementation" means that a particular feature, structure, or characteristic described in connection with the embodiment is included in at least one embodiment of the present disclosure. The appearance of the phrase "in an embodiment" in various places in the specification is not necessarily all refer to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The terms "heterogeneous blockchains", and "heterogeneous blockchain system" may have been used interchangeably throughout the description, and unless the context suggests otherwise, these terms generally refer to a system that includes permissioned and permissionless blockchains with the same operating protocol such that they provide interoperability and secure data sharing along with some access control.

The terms "heterogeneous omni-chain framework", "blockchain interoperability infrastructure", "interoperability infrastructure", "event data framework", and "framework" may have been used interchangeably throughout the description, and unless the context suggests otherwise, these terms generally refer to a framework that enables interconnection of multiple heterogeneous blockchains or heterogeneous blockchain ecosystem. Further, the framework enables them to communicate with each other for the execution of certain tasks.

The terms "cross-chain event data transfer protocol", and "omni-chain interoperability protocol" may have been used interchangeably throughout the description, and unless the context suggests otherwise, these terms generally refer to a protocol that enables the creation of the blockchain interoperability infrastructure by execution of the protocol on a network of nodes such as tessellates, and time nodes.

The term "blockchain ecosystem" may have been used throughout the description, this term generally refers to an ecosystem including blocks of information, hash, previous block hash, public key, private key, nodes (such as computing systems and the like), and peer-to-peer networks at a high level. Further, the term "node(s)" may have been used throughout the description; this term generally refers to network stakeholder(s) and their device(s) (computer system(s)) that are connected in a peer-to-peer (P2P) fashion in the network to keep a track of a distributed ledger (Blockchain and/or timechain) and serve as communication hubs for various network tasks. The nodes are configured to run a protocol software and can store partial or complete copies of the distributed ledger.

The term "timechain" may have been used throughout the description, this term generally refers to a blockchain in which incoming event data from participants, or nodes, is authenticated before being hashed, resulting in a searchable hub of immutable event data.

The term "publisher" may have been used throughout the description; this term generally refers to any node that submits event data to the blockchain network. Further, the term "consumer" may have been used throughout the description; this term generally refers to a user, a decentralized application (dApp) developer, or the like who can use the validated event data to power dApps, applications implemented on other blockchains, microservices, and other intelligent data pipelines.

The terms "tessellate" and "tessellate nodes" may have been used interchangeably throughout the description, and unless the context suggests otherwise, these terms generally refer to special publishers that fetch event data from external blockchains. Further, the term "tessellate network" may have been used throughout the description; this term generally refers to a network of multiple tessellates that join the network for participating in an interoperability process.

The term "time nodes" may have been used throughout the description; this term generally refers to any node in the network that participates in the decentralized consensus process. Moreover, time nodes confirm blocks and append these blocks to the timechain. Further, the term "time electors" may have been used throughout the description; this term generally refers to a special time node that proposes blocks to the timechain. Furthermore, the term "time node network", and "timechain network" may have been used interchangeably throughout the description, and unless the context suggests otherwise, these terms generally refer to a network of time nodes connected to timechains, that join the network for participating in the decentralized consensus process.

Overview

Various embodiments of the present disclosure provide methods and systems for implementing an omni-chain interoperability protocol in an omni-chain network. The approach of the present disclosure provides a heterogeneous omni-chain framework for connecting multiple heterogeneous blockchains while enabling cross-platform communication through validated event data. The framework of the present disclosure is generated by implementing or running a cross-chain event data transfer (XCEDT) protocol on the network of nodes. The network may be a trustless network of nodes such as tessellates and time nodes performing respective tasks requiring the involvement of a timechain that is powered by a Proof-of-Time (PoT) protocol.

Further, for the nodes to participate in the interoperability process provided by the XCEDT protocol, the nodes may have to stake a predefined count of tokens with the network. In an example, the predefined count of the tokens may be fixed for each node. Furthermore, the nodes may be classified into tessellates and time nodes. It should be understood that the tessellates are nodes that fetch event data from external chains, and hence, act as listeners. Any node can join the network as a tessellate and fetch the event data from outside networks. Along with fetching the event data, the tessellates are also responsible for maintaining and running cross-chain routing and transfer of the event data from one network to another, or from a source chain to a destination chain. As may be understood, the term "source chain" refers to a blockchain (i.e., a source blockchain) from where an event data is to be transmitted to a different blockchain (i.e., a destination blockchain). Similarly, the term "destination chain" refers to a blockchain that will receive an event data from an external blockchain (i.e., the source blockchain). Therefore, the tessellates act as writers of the event data onto the external blockchains such as the destination chains. To that end, it should be understood that the operation of the cross-chain routing and transfer of the event data is enabled by executing the XCEDT protocol on the tessellates.

Similarly, the time nodes are nodes that participate in the PoT consensus process. The time nodes confirm blocks and append them to a timechain. The blocks are proposed by time electors which are time nodes that propose the blocks to be added to the timechain. It should be understood that while tessellates fetch and write the event data from the source chain to the destination chain, the time nodes perform the PoT consensus on the event data during the process of obtaining the validated event data. Further, the time nodes append the validated event data onto the timechain. Then, the validated event data is fetched by the tessellates that write the validated event data on the destination chain. Moreover, the nodes (tessellates and/or time nodes) may be incentivized for every validated event data that gets appended to the timechain.

In various embodiments, the XCEDT protocol may include various components such as a threshold signature schemes (TSS) process, a decentralized consensus process (PoT process), Gateway smart contracts, and time graph Application Programming Interface (API) and developer tools operating together to implement process steps (method) involved in the implementation of the XCEDT protocol on the network. In an example, the process steps may include invoking a function for sending a message (event data) from the source chain to the destination chain. This step is implemented by deploying a smart contract at the source chain by including transfer-related information in the smart contract. The event of invoking the function for sending a message is fetched by any tessellate connected to the source chain as event data and transmitted across a Gateway API of the network.

Further, it should be understood that before sending the event data to the timechain network for confirming the event data as a block on the timechain, a supermajority of the tessellates (such as more than 90%) has to attest the event data through the TSS process. Once the supermajority is achieved, the PoT consensus process is triggered on the timechain network, and the attested event data is validated and appended as a block in the timechain. Then, the timechain network may subtract transaction fees from the source chain tokens and prepare an ongoing transaction for inclusion in the destination chain. Further, for writing the validated event data on the destination chain, the tessellates connected to the destination chain fetch the validated event data and the supermajority of the tessellates may have to attest the validated event data. Upon attestation, a token transfer function call may be invoked which is a part of the XCEDT protocol. Further, a function to execute a message (i.e., the validated event data) on the destination chain is executed due to the deployment of a smart contract on the destination chain. In an example, the smart contract may include transfer-related information required for performing the transaction. Thus, completing the implementation of the XCEDT protocol which completes the transmission of the event data from the source chain to the destination chain thereby enabling interoperability during cross-platform operation In an embodiment, the deployment of the smart contract at the source chain also implements a revert function, that can be called by the tessellates any time the delivery of the event data to the destination chain fails. Upon detecting the failure, the network refunds the tokens to a source address associated with the source chain thereby, providing improved security.

Further, various embodiments of the present disclosure offer multiple advantages and technical effects. For instance, the present disclosure enables the communication between multiple heterogeneous blockchains through the XCEDT protocol. The XCEDT protocol provides interoperability and programmability across the heterogeneous blockchain which enables decentralized applications (dApps) to communicate in a frictionless manner across multiple heterogeneous blockchains. Further, by leveraging the XCEDT protocol, the system provides complete composability across various ecosystems such as a web3 ecosystem and the like. The XCEDT protocol also enables blockchain developers to easily plug-in into the blockchain interoperability infrastructure and communicate with other blockchains in a frictionless manner. The XCEDT protocol also enables the users to interact with dApps across multiple heterogeneous blockchain ecosystems through the blockchain interoperability infrastructure.

Further, using the event data framework allow users to create multi-chain order book decentralized exchanges (DEXs) where bids are partially filled across different liquidity pools (LPs) networks. This infrastructure solves the problem of liquidity fragmentation without any centralized bridges or wrapped assets.

FIG. 1 illustrates an exemplary representation of an environment 100 related to at least some embodiments of the present disclosure. Although the environment 100 is presented in one arrangement, other embodiments may include the parts of the environment 100 (or other parts) arranged otherwise depending on, for example, enabling two heterogeneous blockchains to communicate with each other through an omni-chain interoperability layer or an omni-chain interoperability infrastructure (referred interchangeably, hereinafter). The omni-chain interoperability layer is created by implementing or executing an omni-chain or cross-chain event data transfer (XCEDT) protocol on a network of nodes. The environment 100 may depict a network 102 such as a permissionless network with multiple nodes such as tessellates 104(1), 104(2), . . . 104(n), where 'n' may be any non-zero natural number (collectively referred hereinafter as 'tessellates 104') and time nodes 106(1), 106(2), . . . 106(n), where 'n' may be any non-zero natural number (collectively referred hereinafter as time nodes 106) connected with each other to manage a transfer of event data between heterogeneous distributed ledgers such as blockchains 108a and 108b and blockchains 110a and 110b through a timechain 112. It should be noted that the blockchains 108a and 108b and the blockchains 110a and 110b are heterogeneous therefore, they belong to two different blockchain ecosystems. For example, a first blockchain ecosystem may include the blockchains 108a and 108b and a second blockchain ecosystem may include the blockchains 110a and 110b. In one non-limiting example, the blockchains 108a and 108b may be 'Ethereum™ blockchains' (public permissionless) and the blockchains 110a and 110b may be 'Sovereign blockchains' (public permissioned).

In one embodiment, the network 102 may include wired networks, wireless networks, and combinations thereof. Some non-limiting examples of the wired networks may include Ethernet, local area networks (LANs), fiber-optic networks, and the like. Some non-limiting examples of the wireless networks may include cellular networks like GSM/3G/4G/5G/LTE/CDMA networks, wireless LANs, Bluetooth, Wi-Fi or Zigbee networks, and the like. An example of a combination of wired and wireless networks may include the Internet.

In an example scenario, the tessellates (e.g., tessellate 104(1)) that are part of the first blockchain ecosystem may be connected to the blockchains 108a and/or 108b, and hence each tessellate (i.e., tessellate 104(1)) may store an instance of the blockchains 108a and 108b. Similarly, the tessellates (e.g., tessellate 104(2)) that are part of the second blockchain ecosystem may be connected to the blockchains 110a and/or 110b, and hence each tessellate (i.e., tessellate 104(2)) may store an instance of the blockchains 110a and 110b. Further, the time nodes ((e.g., time node 106(1)) store an instance of the timechain 112. Further, the blockchains 108a, 108b, 110a, and 110b, and the timechain 112 may include multiple blocks, where each block may include data in an encrypted form.

The illustrated environment 100 further depicts a plurality of users (see, 114 and 116) associated with a plurality of user devices (see, 118 and 120) respectively, a plurality of decentralized application (dApp) developers (see, 122 and 124) associated with a plurality of dApp developer devices (see, 126 and 128) respectively, and dApps 130 and 132. For example, the plurality of user devices 118 and 120, and the plurality of dApp developer devices 126 and 128 may include any suitable electronic or computing devices such as a smartphone, a personal computer, a laptop, an electronic tablet, a desktop computer, a wearable device, a smart device such as smart TV or smart appliance, etc., among other suitable electronic devices.

Further, it should be noted that the number of nodes (tessellates 104 and time nodes 106), blockchains 108a and 108b, timechains 112, the plurality of users 114 and 116, the plurality of dApp developers 122 and 124, the plurality of user devices 118 and 120, and the plurality of dApp developer devices 126 and 128 as described herein are only used for exemplary purposes and do not limit the scope of the invention. The main objective of the invention is to provide an omni-chain interoperability layer or infrastructure that connects multiple heterogeneous blockchains, thereby enabling dApps to communicate with the various heterogeneous blockchains in a frictionless manner. The omni-chain interoperability layer also enables the dApp developers on one blockchain to call and use any function on another blockchain ecosystem. Further, the omni-chain interoperability layer enables the users to seamlessly interact with dApps across multiple blockchain ecosystems. Further, the omni-chain interoperability layer of the present disclosure provides an easy plug-in solution that can be applied to existing dApp architecture without a major overhaul of the existing application. The omni-chain interoperability layer further enables the dApp developers to easily build cross-chain applications or omni-chain applications by leveraging a universal Application Programming Interface (API) by implementing the omni-chain protocol using an API.

For example, the network 102 may be a public network that is available for any node 104 and 106 to join and participate in an interoperability process to attest and validate transactions and data in the network 102. Further, when the blockchain 108a from the first blockchain ecosystem needs to communicate with the blockchain 110a present in the second blockchain ecosystem, a request for communication may have to be initiated. The request for communication may be initiated by the deployment of a smart contract using a gateway API of the blockchain 108a and the blockchain 110a by a dApp developer 122 through a dApp 130 accessed via a dApp developer device 126. In an example, the request may constitute an event data related to the transaction.

In some embodiments, the smart contract deployed on the blockchain 108a may be a first smart contract and the smart contract deployed on the blockchain 110a may include a second smart contract. Thus, the event data may include information related to the first smart contract. Further, the first smart contract and the second smart contract may include transaction details required for transmission of the event data as a transaction from the blockchain 108a to the blockchain 110a. In a non-limiting example, the first contract and the second contract may be the same. Further, for the purpose of description of the present disclosure, the blockchains 108a and 108b are hereinafter interchangeably referred to as a first blockchain 108a and 108b, and the blockchains 110a and 110b are hereinafter interchangeably referred to as a second blockchain 110a and 110b. The transaction details may include at least one of a first smart contract address, a second blockchain identity (ID), a second smart contract address associated with the second blockchain 110a and 110b, tokens to transfer, a gas limit on the second blockchain 110a and 110b, a contract message (memo) for the transaction from the first blockchain 108a and 108b to the second blockchain 110a and 110b, and the like.

Further, each blockchain is connected to the timechain 112 through the tessellates 104 that serve as relay networks. The tessellates 104 in the network 102 transfer the event data between the two or more blockchains through remote procedure calls (RPCs) which is explained further in the description with reference to FIG. 4. The event data may be fetched by a tessellate (such as tessellate 104(1)) which may be connected to the blockchain 108a. The event data informs the participants of any ongoing activity or action in the network 102 at a specific time in any blockchain. For example, the event data may include information related to actions in smart contracts within the dApps that may be used to detect specific events, debug an application, or notify participants on the network 102 that an operation has occurred. More specifically, the event data may correspond to financial transactions, medical records, and the like.

Upon fetching the event data, the tessellate 104(1) along with other tessellates (such as 104(2), 104(3) ... 104(n)) that are connected to the blockchain 108a may have to attest the event data to ensure that the event data is genuine. To that end, before transmitting the event data to the time nodes 106 for confirming the event data on the timechain 112, a supermajority (e.g., more than 90 percent (%)) of the tessellates 104 attest the event data by signing the event data through a threshold signature schemes (TSS) process which is further explained in detail in the description with reference to FIG. 6 and FIG. 7. Further, if a supermajority of the tessellates 104 attest the event data, then the attested event data is transmitted to the time nodes 106 of the network 102. The time nodes 106 receives the event data and determines whether the attested event data is attested by a supermajority of the tessellates on the blockchain 108a or not. Upon determining that the attested event data is attested by the supermajority of the tessellates, the time nodes 106 validate the attested event data based at least on a Proof-of-Time (PoT) consensus process which is explained further in the description with reference to FIG. 3, thereby obtaining validated event data. In order to verify and store the attested event data on the timechain 112, the time nodes 106 of the network 102 implement the PoT consensus process. Upon validation, the validated event data is appended on the timechain 112 as a block.

Further, the time nodes 106 prepare for transmission of the validated event data as an ongoing transaction from the blockchain 108a to the blockchain 110a based, at least in part, on the block appended on the timechain 112. The tessellate 104(2) connected to the blockchain 110a accesses the validated event data from the timechain 112. Then, the tessellate 104(2) along with other tessellates connected to the blockchain 110a performs attestation on the validated event data based at least in part on the TSS process. Further, the tessellate 104(2) completes the transmission of the validated event data as the ongoing transaction from the blockchain 108a to the blockchain 110a, when the attestation is received from a supermajority of the tessellates on the blockchain 110a. The completion of the transmission or completing the process of writing the validated event data on a gateway of the blockchain 110a, is invoked or triggered by a second smart contract deployed on the blockchain 110a The second smart contract may include a function for executing the message i.e., the validated event data (e.g., execute_message ( ))

Figure 5:
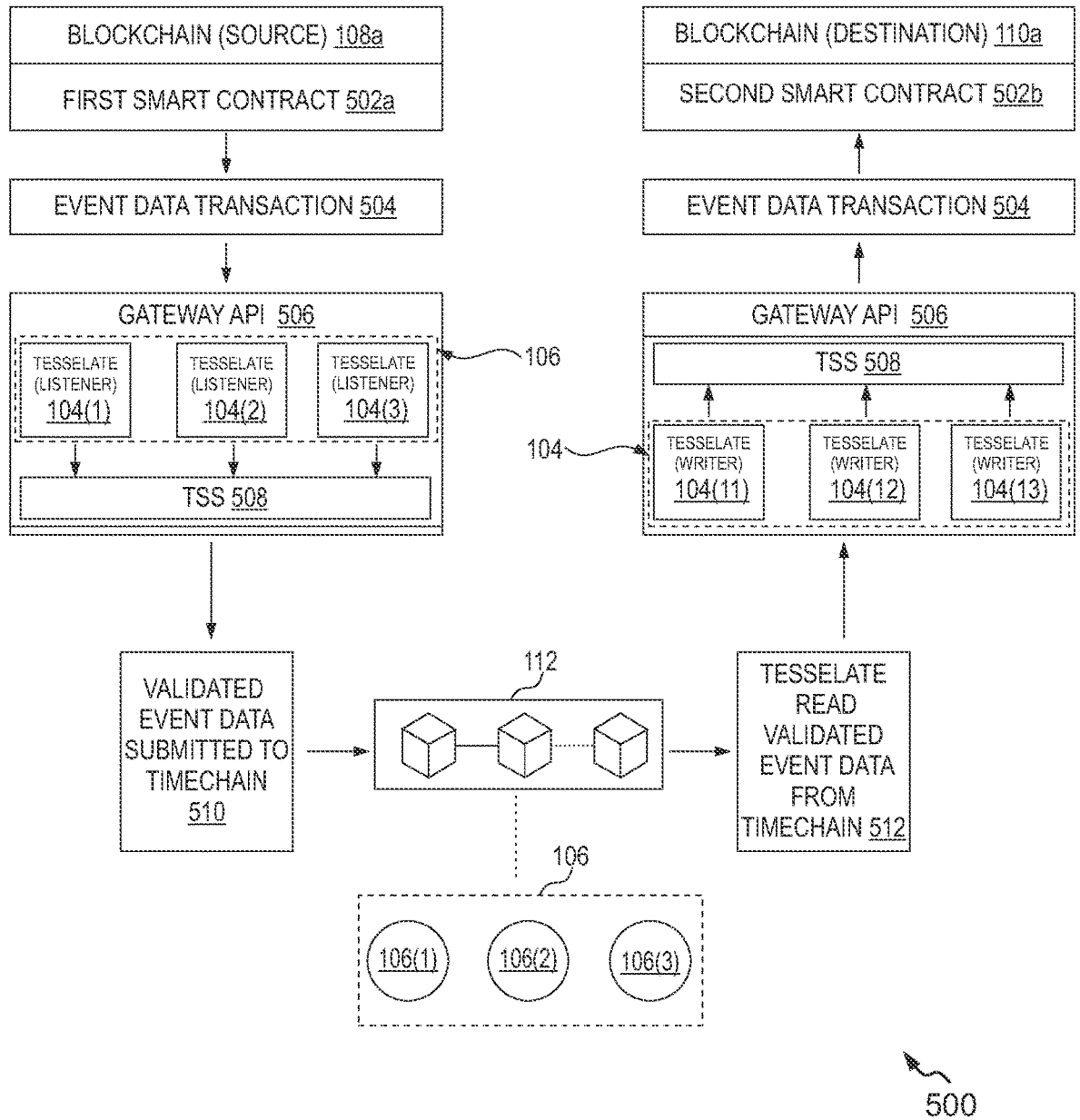
FIG. 5 is a high-level schematic representation of an XCEDT protocol, in accordance with an embodiment of the present disclosure.

In an embodiment, the network 102 may be a permissionless network that runs the XCEDT protocol on the tessellates 104 (explained in detail further in the description with reference to FIG. 5) for attesting the event data. In another embodiment, the network 102 may run or execute the PoT consensus protocol on the time nodes 106 for validating the attested event data, thereby enabling decentralization and interoperability in the network 102. Therefore, the network 102 is basically providing routing and validation services. It should be understood that the XCEDT protocol is a generic messaging protocol that allows any dApp developers building on the network 102 to call and use any function on other connected networks. For example, the dApp developers such as the dApp developers 122 and 124 may select a blockchain best suited for their cases and build a cross-chain solution that offers users such as the users 114 and 116 a seamless and one-click experience, thereby allowing the users 114 and 116 to interact with any asset on any network. Further, the tessellates 104 serve as byzantine fault tolerant (BFT) notaries that attest to the validity of the event data (cross-chain requests) from the first blockchain 108a to the second blockchain 110a in the XCEDT protocol. Furthermore, the tessellates 104 may also relay these messages across the network 102.

In a non-limiting example, a node (such as, each of the tessellates 104 and time nodes 106) can be a computing device associated with a user (such as user 114). The nodes 104 and 106 are configured to register with the network 102 before connecting to the network 102. In other words, the user 114 associated with the nodes 104 and 106 has to register with the network 102 and may have to create an account with an omni-chain network provider. In one embodiment, the node 104 and 106 is installed with an application upon registration to access the network 102. The user account may include a digital wallet to depict tokens acquired by the user 114. The tokens are staked in the network 102 to participate in the interoperability process to route and validate the transmission of the event data from the first blockchain 108a to the second blockchain 110a through the timechain 112.

It should be understood that any node in the network 102 can participate as a tessellate in the interoperability process associated with the XCEDT protocol by stacking a predefined count of the tokens with the network 102. The predefined count of the tokens may be fixed for each node to ensure economic safety, also referred to as bonded tokens or fixed stakes. The tessellates 104 are subject to a penalty upon tessellate failure or malfeasance which is referred to as 'slashing' in the context of blockchain. Similarly, any node in the network 102 can participate as a time node in the interoperability process associated with the XCEDT protocol for performing decentralized consensus by stacking a predefined count of the tokens with the network 102. Just like the tessellates 104, the predefined count of the tokens may be fixed for each time node as a 'bootstrapping mechanism'. Further, once the time node has participated in at least one consensus round, the network 102 begins to rely solely on a ranking score associated with the time nodes 106 as a parameter for validation which is a part of the decentralized consensus process. The staked tokens are subject to slashing upon time node failure or malfeasance behavior. Upon installation of the application associated with the network 102, the tessellates 104 may be configured to run or execute the XCEDT protocol, and the time nodes 106 may be configured to run or execute the PoT protocol which is explained further in the description with reference to FIGS. 2-3 respectively.

Figure 2:
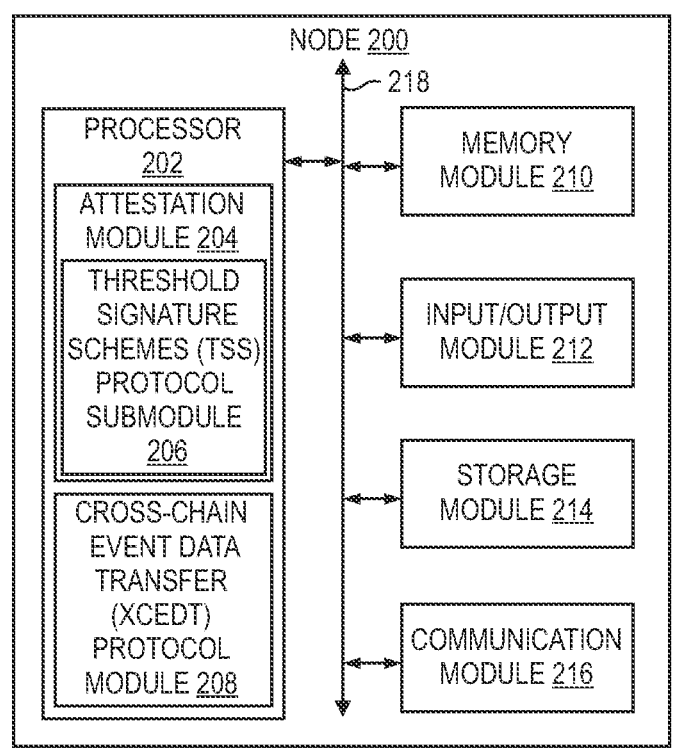
FIG. 2 is a simplified block diagram representation of a node configured to run a cross-chain event data transfer (XCEDT) protocol, in accordance with an embodiment of the present disclosure.

FIG. 2 is a simplified block diagram representation of a node 200 configured to run the XCEDT protocol, in accordance with an embodiment of the present disclosure. It should be noted that the node 200 may be same as the node 104 of FIG. 1. In an embodiment, the node 200 includes at least one processor, such as a processor 202. The processor 202 is depicted to include an attestation module 204 and a cross-chain event data transfer (XCEDT) protocol module 208. It should be noted that the processor 202 may include other modules for its operation as well.

In an embodiment, the attestation module 204 may further include a threshold signature schemes (TSS) protocol submodule 206. The node 200 may further include a memory module 210, an input/output (I/O) module 212, a storage module 214, and a communication module 216. It is noted that although the node 200 is depicted to include only one processor, the node 200 may include a greater number of processors therein. In an embodiment, the memory module or the memory 210 is capable of storing machine-executable instructions. Further, the processor 202 is capable of executing the machine-executable instructions. In an embodiment, the processor 202 may be embodied as a multi-core processor, a single-core processor, or a combination of one or more multi-core processors and one or more single-core processors. For example, the processor 202 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application-specific integrated circuit (ASIC), a field-programmable gate array (FPGA), a microcontroller unit (MCU), a hardware accelerator, a special-purpose computer chip, and/or the like. In an embodiment, the processor 202 may be configured to execute hard-coded functionality. In an embodiment, the processor 202 is embodied as an executor of software instructions, wherein the instructions may specifically configure the processor 202 to perform the algorithms and/or operations described herein when the instructions are executed. The modules of the processor 202 may be implemented as software modules, hardware modules, firmware modules, or as a combination thereof.

The memory 210 may be embodied as one or more volatile memory devices, one or more non-volatile memory devices, and/or a combination of one or more volatile memory devices and non-volatile memory devices. For example, the memory 210 may be embodied as semiconductor memories (such as mask ROM, PROM (programmable ROM), EPROM (erasable PROM), flash memory, RAM (random access memory), etc.), magnetic storage devices (such as hard disk drives, floppy disks, magnetic tapes, etc.), optical magnetic storage devices (e.g., magneto-optical disks), CD-ROM (compact disc read-only memory), CD-R (compact disc recordable), CD-R/W (compact disc rewritable), DVD (Digital Versatile Disc) and BD (BLU-RAY® Disc), and/or the like.

In at least some embodiments, the memory 210 stores logic and/or instructions, which may be used by modules of the processor 202, such as the attestation module 204, the TSS protocol submodule 206, and the cross-chain event data transfer (XCEDT) protocol module 208, for implementing the XCEDT protocol. For example, the memory 210 includes logic for receiving event data from the first blockchain 108a, attesting the event data, transmitting the attested event data to the time nodes, and the like.

In an embodiment, the I/O module 212 may include mechanisms configured to receive inputs from and provide outputs to an operator(s) of the node 200. To that effect, the I/O module 212 may include at least one input interface and/or at least one output interface. Examples of the input interface may include, but are not limited to, a keyboard, a mouse, a joystick, a keypad, a touch screen, soft keys, a microphone, and the like. Examples of the output interface may include, but are not limited to, a display such as a light-emitting diode display, a thin-film transistor (TFT) display, a liquid crystal display, an active-matrix organic light-emitting diode (AMOLED) display, a microphone, a speaker, a ringer, a vibrator, and/or the like. In an example embodiment, the processor 202 may include I/O circuitry configured to control at least some functions of one or more elements of the I/O module 212, such as, for example, a speaker, a microphone, a display, and/or the like. The processor 212 and/or the I/O circuitry may be configured to control one or more functions of the one or more elements of the I/O module 212 through computer program instructions, for example, software and/or firmware, stored on a memory, for example, the memory 210, and/or the like, accessible to the processor 202.

The communication module 216 may include communication circuitry such as for example, a transceiver circuitry including an antenna and other communication media interfaces to connect to a communication network, such as the network 102 shown in FIG. 1. The communication circuitry may, in at least some example embodiments, enable reception of the event data in the network 102 by the node 200 (such as tessellate 104(1)). The communication circuitry may further be configured to enable transmission of the event data from the tessellate 104(1) that fetched the event data to other tessellates (such as 104(2) and so on) in the network 102 for attestation purposes, then transmission of the attested event data to the time nodes 106 (as shown in FIG. 1), and retrieving of the validated event data from the timechain 112.

The storage module 214 is any computer-operated hardware suitable for storing and/or retrieving data. In one embodiment, the storage module 214 includes a repository for storing the event data, public keys of the tessellates 104 in the network 102, storing an instance of the blockchains in different blockchain ecosystems that are connected in the interoperability layer or infrastructure created by running the XCEDT protocol, and a current state of the blockchains. The storage module 214 may include multiple storage units such as hard drives and/or solid-state drives in a redundant array of inexpensive disks (RAID) configuration. In some embodiments, the storage module 214 may include a storage area network (SAN) and/or a network-attached storage (NAS) system.

In some embodiments, the processor 202 and/or other components of the processor 202 may access the storage module 214 using a storage interface (not shown in FIG. 2). The storage interface may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 202 and/or the modules of the processor 202 with access to the storage module 214.

The various components of the node 200, such as the processor 202, the memory 210, the I/O module 212, the storage module 214, and the communication module 216 are configured to communicate with each other via or through a centralized circuit system 218. The centralized circuit system 218 may be various devices configured to, among other things, provide or enable communication between the components of the node 200. In certain embodiments, the centralized circuit system 218 may be a central printed circuit board (PCB) such as a motherboard, a main board, a system board, or a logic board. The centralized circuit system 218 may also, or alternatively, include other printed circuit assemblies (PCAs) or communication channel media.

Initially, the node 200 is installed with a tessellate application also known as a dApp to access the network 102. The XCEDT protocol is provided to facilitate the routing and validation services to the transactions in the network 102. The node 200 is configured to function as a tessellate (such as 104(1)) to participate in the interoperability process. The attestation module 204 in the node 200 connected to the first blockchain 108a is configured to receive the event data from the first blockchain 108a. The event data includes information related to the first smart contract. The TSS protocol submodule 206 in the node 200 connected to the first blockchain 108a is configured to attest the event data based at least on the TSS process.

Further, the attestation module 204 in the node 200 connected to the second blockchain 110a is configured to retrieve the validated event data from the timechain 112. Further, the TSS protocol submodule 206 in the node 200 connected to the second blockchain 110a is configured to attest the validated event data, based at least on the TSS process. The XCEDT protocol module 208 in the node 200 connected to the second blockchain 110a is configured to direct the completion of the transmission of the validated event data as the ongoing transaction from the first blockchain 108a to the second blockchain 110a, invoked by the second smart contract deployed on the second blockchain 110a, when a count of the nodes that attested the validated event matches the predefined criterion. The second smart contract includes the transaction details.

In an embodiment, the cross-chain event data transfer (XCEDT) protocol module 208 in the node 200 connected to the first blockchain 108a is configured to direct the transmission of the attested event data to the time nodes 106 of the omni-chain network 102 for obtaining the validated event data upon validation, when a count of the nodes that attested the event data matches a predefined criterion. The predefined criterion may include a condition that a count of the nodes that participate in the attestation of the event data is greater than 90 percent. The validated event data is appended as a new block onto the timechain 112 of the omni-chain network 102.

Figure 3:
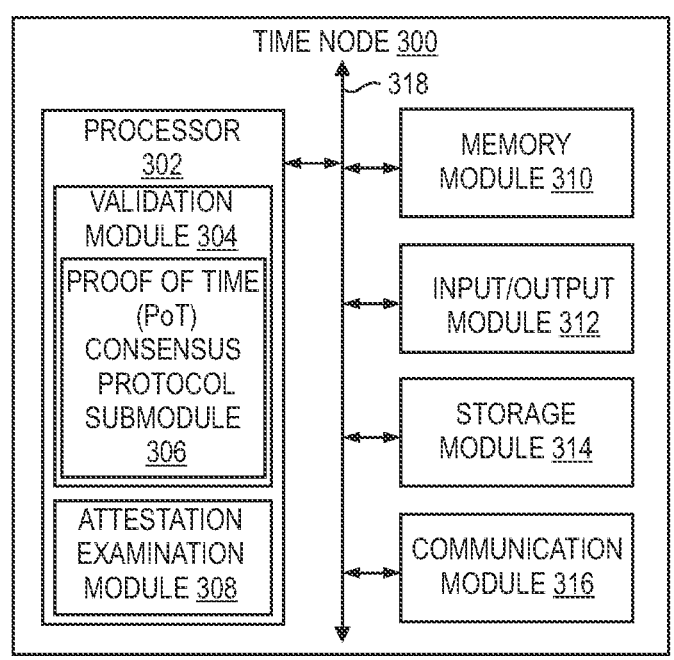
FIG. 3 is a simplified block diagram representation of a time node configured to run an attestation examination process and a decentralized consensus protocol (attestation examination module), in accordance with an embodiment of the present disclosure.

FIG. 3 is a simplified block diagram representation of a time node 300 configured to run an attestation examination process and a decentralized consensus protocol, in accordance with an embodiment of the present disclosure. It should be noted that the time node 300 is similar to any of the time nodes 106 of FIG. 1. The time node 300 includes at least one processor, such as a processor 302. The processor 302 is depicted to include a validation module 304. The validation module 304 may further include a Proof-of-Time (PoT) protocol submodule 306. The processor 302 may also include an attestation examination module 308. The processor 302 may further include a memory module 310, an input/output (I/O) module 312, a storage module 314, and a communication module 316. Further, in an example, parts of the processor 302, the memory 310, the I/O module 312, and the communication module 316, and most of the configuration may be is similar to the processor 202, the memory 210, the I/O module 212, and the communication module 216 of FIG. 2.

A few of the configurations may vary such as the memory 310 stores logic and/or instructions, which may be used by modules of the processor 302, such as the validation module 304, the PoT protocol submodule 306, and the attestation examination module 308, for implementing the PoT protocol. For example, the memory 310 includes logic for receiving attested event data from the node 200, determining that the attestation satisfies the predefined criterion, validating the attested event data, appending the validated event data as a new block on the timechain 112, preparing for the transmission of the validated event data for an ongoing transaction from the first blockchain 108a to the second blockchain 110a, and/or the like.

Further, the communication circuitry may, in at least some example embodiments, enable reception of the validated event data in the network 102 by the time node 300. The communication circuitry may further be configured to enable transmission of the proposed block by the time node 300 that is selected as a time elector to other time nodes in the network 102. Similarly, in one embodiment, the storage module 314 includes a repository for storing the validated event data, public keys of the time nodes 106 in the network 102, storing an instance of the timechain 112, and a current state of the timechain 112.

Moreover, the various components of the time node 300, such as the processor 302, the memory 310, the I/O module 312, the storage module 314, and the communication module 316 are configured to communicate with each other via or through a centralized circuit system 318. The centralized circuit system 318 may be similar to the centralized circuit system 218 of FIG. 2.

Initially, the time node 300 is installed with a timechain application also known as a dApp to access the network 102. The PoT protocol is provided to facilitate the decentralized consensus of the transactions in the network 102. During the PoT consensus process, in an example, some of the nodes 106 may be configured to function as the time elector and some as the time nodes to participate in the PoT consensus process. The PoT protocol is divided into time slots (hereafter referred to as a 'slot'), where each slot is associated with a new block to be added to the timechain 112. In one example, the PoT consensus process may include self-selecting a time node 300 as a time elector for collating the attested event data from the nodes 104 as a new block on the first blockchain 108a. Further, the process includes verifying, by the time elector, the attested event data to be valid by generation of a verifiable delay function (VDF) proof. The process also includes generating, by the time elector, the new block to be added to the timechain 112, the new block including the attested event data, and the current state of the timechain 112. The process also includes broadcasting, by the time elector, the new block along with the VDF proof to other time nodes for confirmation. Further, the process includes verifying, by the time nodes 106, the new block and the VDF proof received from the time elector based at least on a public key of the time elector. Lastly, the process includes upon successful verification, appending, by the time nodes, the new block on the timechain 112.

In an example, appending the new block on the timechain 112 may include appending the new block on the timechain 112 based at least on a voting result matching a predefined condition. The predefined condition may include the voting result including that more than 66.67 percent (%) of the time nodes 106 voted to accept the new block to be appended in the timechain 112, thereby ensuring security.

The validation module 304 is configured to receive the attested event data from the nodes 104 on the first blockchain 108a of the omni-chain network 102, the attested event data to be transmitted as a transaction from the first blockchain 108a to the second blockchain 110a. The attestation examination module 308 is configured to determine a count of the nodes 104 that attested the event data for obtaining the attested event data to match the predefined criterion.

In another embodiment, the PoT protocol submodule 306 is configured to validate the attested event data based at least on a Proof-of-Time (PoT) consensus process. The validation module 304 is further configured to append the validated event data on the timechain 112 as a new block. Here, in order to append the validated event data to the timechain 112, the validated event data undergoes two stages such as soft voting and hard voting. Furthermore, the validation module 304 is also configured to prepare the transmission of the validated event data as the ongoing transaction from the first blockchain 108a to the second blockchain 110a based at least on the new block appended on the timechain 112.

Figure 4:
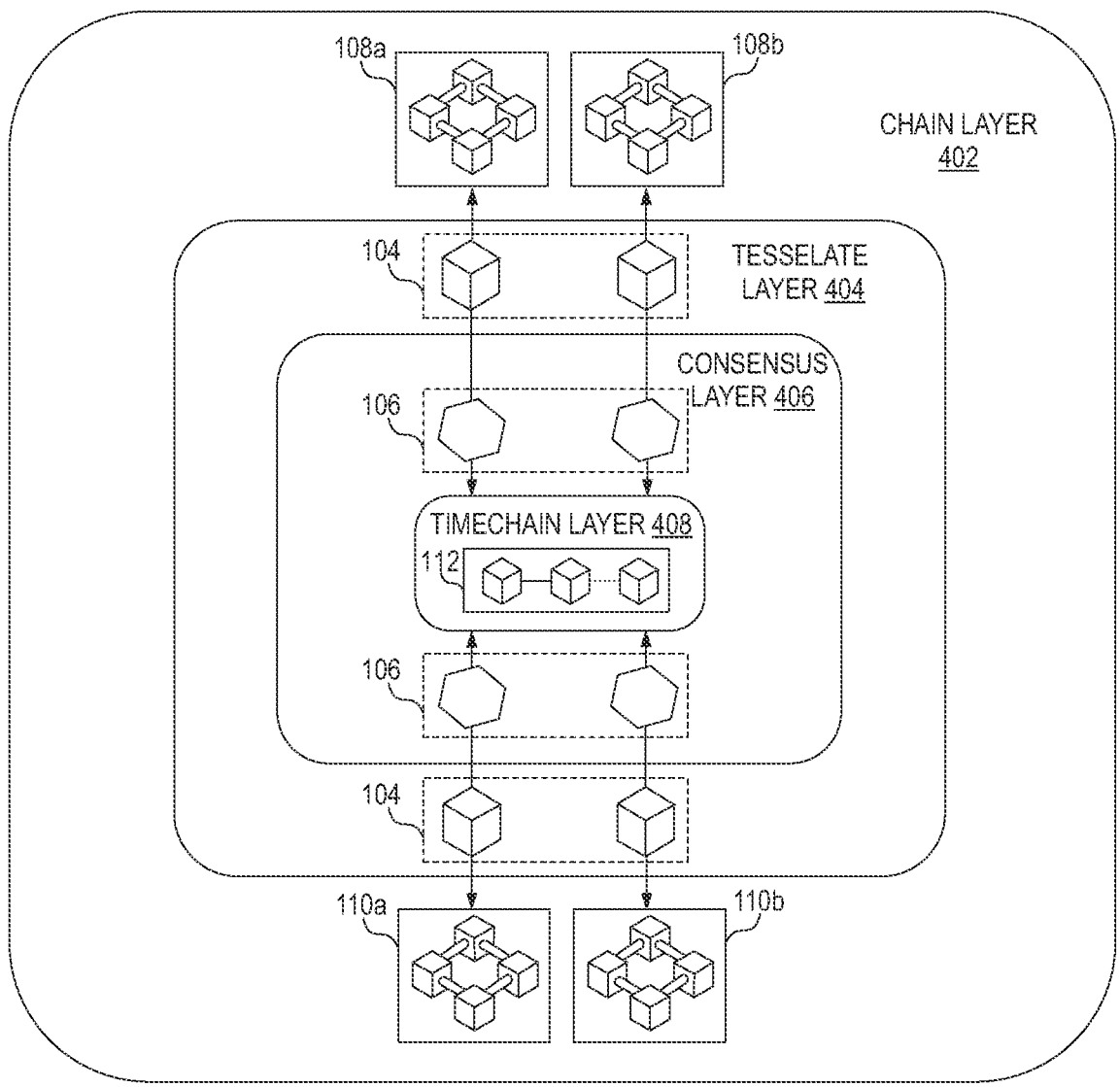
FIG. 4 is a high-level schematic representation of an interoperability infrastructure created by running an XCEDT protocol for connecting multiple heterogeneous blockchains in an omni-chain network, in accordance with an embodiment, of the present disclosure.

FIG. 4 is a high-level schematic representation of an interoperability infrastructure 400 created by running the XCEDT protocol for connecting multiple heterogeneous blockchains (such as blockchains 108a, 108b, with the blockchains 110a, 110b) in the omni-chain network 102, in accordance with an embodiment of the present disclosure. The network 102 provides four layers to the interoperability infrastructure 400 such as a chain layer 402, a tessellate layer 404, a consensus layer 406, and a timechain layer 408. The chain layer 402 may include multiple heterogeneous blockchains, for example, Sovereign blockchains such as Ethereum™ and Solona™ that want to connect to the network 102. Each blockchain may operate on a different consensus algorithm, use case, and tokenization framework. Further, the tessellate layer 404 may be a core layer of the network 102 that facilitates monitoring and transmitting message(s) in cross-chain transactions. The tessellates 104 ensures interoperability between the multiple heterogeneous blockchains. To that end, the consensus layer 406 is completely decentralized, unlike centralized or federated bridges that require a trusted third-party for the cross-chain transfer of assets. The infrastructure 400 relies completely on the decentralized time nodes 106 to confirm the fetched event data in a completely trustless manner. Lastly, the timechain layer 408 facilitates the timechain 112 that stores confirmed event data emanating from multiple heterogeneous blockchains.

Moreover, in the context of transmitting message(s), the event data transmitted from the first blockchain 108a to the timechain 112 and finally to the second blockchain 110a may include a previous block hash, a transaction hash (Merkle tree hash), nonce, a block height, and Merkle Proofs. As used herein, the term "Merkle Proof" refers to the values to hash together with the value being proved to get back the Merkle root which is a simple mathematical method to verify the data on a Merkle tree.

Further, in an exemplary scenario, the tessellates 104 and the time nodes 106 may provide four essential services in regard to interoperability:

1. Monitoring: The tessellates 104 on the network 102 regularly monitor the status of the first blockchain 108a.
2. Passing or transmitting Message(s): The tessellates 104 periodically fetch new instances of the event data from the first blockchain 108a to the timechain 112 whenever the state of the first blockchain 108a changes. The tessellates 104 may also relay the event data from the first blockchain 108a to subscribers and get rewarded with tokens.
3. Signing: For any fetched event data to be valid, a group of tessellates has to partially sign the event data and relay the signed event data to the network 102. Once relayed to the network 102, a payload of the signed event data undergoes the PoT consensus process and the time nodes 106 append to the timechain 112.
4. Trustless interoperability: Any user can join the network 102 and operate as a tessellate such as 104(1). Similarly, any node can become a time elector or a time node such as 106(1), and run or execute the PoT protocol. This creates a trustless interoperability ecosystem for cross-chain communication and sharing the event data.

FIG. 5 is a high-level schematic representation 500 of the XCEDT protocol, in accordance with an embodiment of the present disclosure. The XCEDT protocol sits atop the network 102. The XCEDT protocol provides a routing service for selecting a path for the event data to travel from the first blockchain 108a to the second blockchain 110a. Further, the XCEDT protocol provides validation services that validate the event data before appending a new block on the timechain 112. As may be understood, the XCEDT protocol is a generic messaging protocol that allows any dApp developer to call and use any function on other connected networks. Further, by leveraging the XCEDT protocol, the platform provides complete composability across a web3 ecosystem. For instance, the developer of dApp can select the blockchain best suited for their use cases and build a cross-chain solution that offers users a seamless and one-click experience thereby, allowing them to interact with any asset on any network.

In one implementation, the XCEDT protocol starts with its essential feature that includes attaching the event data with a value in the form of tokens. A messaging layer of the XCEDT protocol consists largely of interface smart contracts on the blockchains in the network 102. A dApp developer may have to deploy a smart contract such as a first smart contract 502*a* and a second smart contract 502*b* on the source and destination blockchains (i.e., 108*a* and 110*a*, respectively). The event data attached with value may be referred to as an event data transaction 504 initiated from the first blockchain 108*a*. The first smart contract 502*a* may be deployed on a gateway API 506 on the first blockchain 108*a* Similarly, the second smart contract 502*b* may be deployed on the gateway API 506 on the second blockchain 110*a*. It should be noted that the for the sake of explanation, the same gateway API 506 is described hereinafter, however different gateway APIs may also be used to perform the functions described in the present disclosure. In an example scenario, the first smart contract 502*a* may also include a function (e.g., send_message ( ) for sending a message along with the transaction details. Further, the first smart contract may include a function for reverting the message (e.g., revert message ( ) that may be called by the tessellates 104 any time a delivery of the event data to the second blockchain 110*a* from the first blockchain 108*a* fails. For example, the function for reverting the message (event data) may be triggered whenever a vault of the second blockchain 110*a* is out of funds, out of gas, an invalid message, and/or the like.

For example, the user (such as user 114) initiates the function for sending the message by deploying the first smart contract 502*a* on the first blockchain 108*a* and the second smart contract on the second blockchain 110*a* respectively. The event data transaction 504 is fetched by any one of the tessellates 104(1)-104(3) on the first blockchain 108*a* through the gateway API 506. Then, the event data transaction 504 is distributed to all other tessellates on the first blockchain 108*a* for attestation through the TSS process 508. When the event data transaction 504 is attested by a supermajority (say more than 90%) of tessellates on the first blockchain 108*a*, then the event data transaction 504 is submitted to the time nodes 106.

Further, the attested event data is validated through the PoT consensus protocol by the time nodes 106. Then, the validated event data is added as a new block on the timechain 112. To that end, a step of the validated event data submitted to the timechain 112 is depicted in FIG. 5 as 510. Further, any of the tessellates 104 such as tessellates 104(11), 104(12), or 104(13) on the second blockchain 110*a* reads or retrieves the validated event data from timechain 112. Then, a step of the tessellates read the validated event data from the timechain 112 is depicted in FIG. 5 as 512. The validated event data that is retrieved from the timechain 112 by a tessellate say 104(11) on the second blockchain 110*a* is distributed among all the other tessellates on the second blockchain 110*a*. Further, the validated event data received by the tessellates on the second blockchain 110*a* are attested by performing the TSS process 508 once again. The validated event data on the second blockchain 110*a* may have to be attested by a supermajority (say more than 90%) of the tessellates on the second blockchain 110*a* through the TSS process 508. Then, the validated event data 504 is then written on a gateway of the second blockchain 110*a* through the gateway API 506. During this process, the second smart contract 502*b* deployed on the second blockchain 110*a* invokes the writing of the validated event data 504 on the second blockchain 110*a* hence, the XCEDT protocol is completed by successfully transmitting the event data from the first blockchain 108*a* to the second blockchain 110*a*.

Figure 6:
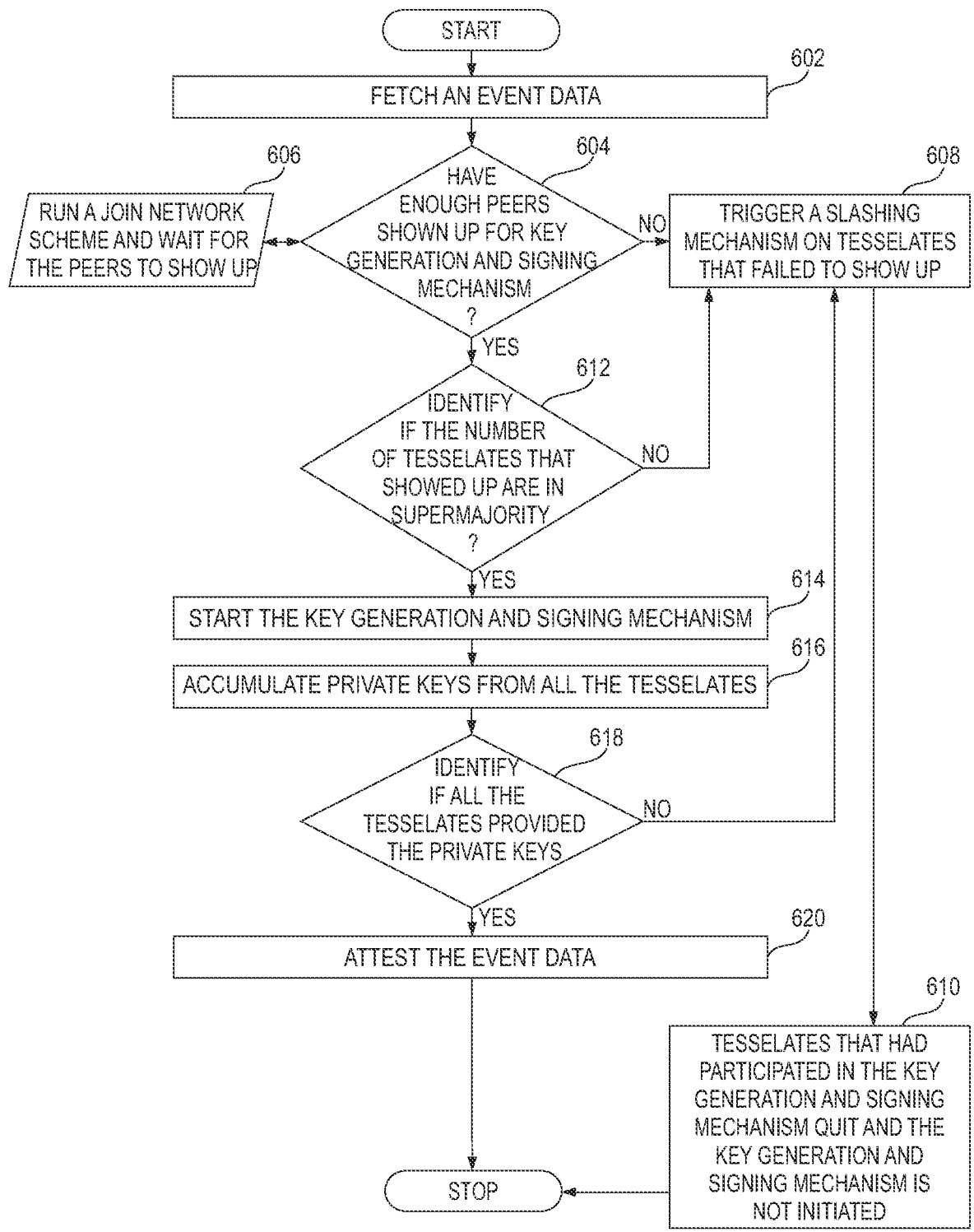
FIG. 6 depicts a process flow of a threshold signature schemes (TSS) process for attesting an event data in an omni-chain network, in accordance with an embodiment of the present disclosure.

FIG. 6 depicts a process flow 600 of the TSS process for attesting the event data in the omni-chain network, in accordance with an embodiment of the present disclosure. In the TSS process, a group of tessellates of the tessellates 104(1), 104(2), . . . , 104(*n*) collaborate to generate a public key that other nodes (such as the time nodes) can use to validate the correctness of a given signature. The TSS process includes a key generation and signing mechanism explained further in the present disclosure with reference to FIG. 7. Further, the TSS process is essentially leaderless, which means no tessellate involved in the key generation and signing mechanism knows a private key associated with each tessellate. However, a threshold of the tessellates 104 can compute a signature without any one of them learning the information about the private key. The TSS process includes steps from 602 to 626.

At step 602, a node (i.e., a tessellate 104(1)) fetches the event data across the gateway API 506 of the network 102 on the first blockchain 108*a*.

At step 604, the tessellate 104(1) identifies if enough peers have shown up for participating in the 'key generation and signing mechanism' by running a 'join network scheme' and waiting for the peers to show up. At step 606, the tessellate 104(1) runs the 'join network scheme' and waits for the peers to show up.

In an example, the join network scheme may correspond to a scheme that is performed by a tessellate 104(1) that fetched the event data. The join network scheme may include checking if enough peers (e.g., 20 tessellates) are available in the network 102 to initiate the key generation and signing mechanism. The join network scheme may include a step of sending a key generation and/or key signing request to all the peers in the network 102 via a peer-to-peer (P2P) process to check if enough peers can show up for attestation. Further, the peers may have to respond to this request within a predefined time interval. The predefined time interval may be at least about 0.5 seconds. If enough peers do not respond within the predefined time interval, then the TSS process aborts. Further, if enough peers respond within the predefined time interval, then the TSS process continues.

Upon detecting that not enough peers have shown up, the process flow proceeds to step 608, at step 608, the tessellate 104(1) and other nodes (other tessellates) that showed up on the first blockchain triggers a slashing mechanism on nodes that failed to show up, upon identifying that enough peers have not shown up.

At step 610, the tessellate 104(1) prevents an initiation of the 'key generation and signing mechanism' when the tessellate 104(1) and other tessellates that participated in the 'key generation and signing mechanism' quit based at least on the slashing mechanism, and hence the TSS process stops.

Alternatively, upon detecting that enough peers have shown up, the process flow proceeds to step 612, at step 612, the tessellate 104(1) identifies if the number of nodes (tessellates) that showed up is in supermajority. Upon identifying that the number of tessellates that showed up is not in supermajority, the process flow proceeds with step 608 followed by step 610, and then, the TSS process stops.

Alternatively, upon identifying that the number of tessellates that showed up is in supermajority, the process flow proceeds with step 614, at step 614, the tessellate 104(1) and other tessellates that showed up on the first blockchain start or initiate the 'key generation and signing mechanism'.

For example, identifying enough peers may correspond to identifying if a predetermined count of peers has shown up, wherein the predetermined count of peers may include at least about 20 peers. Further, identifying that the number of tessellates that showed up are in supermajority may correspond to identifying that the predetermined count is matching the predefined criterion, wherein the predefined criterion may include a condition that the predetermined count of nodes (tessellates) that participate in the attestation of the event data is greater than 90 percent. For example, if the predetermined count may be 20, then 90 percent of the predetermined count may be 18. Thus, when 18 tessellates show up for attestation then, it is understood that the tessellates that participated in the attestation are in supermajority and the predefined criterion is matched.

At step 616, the tessellate 104(1) accumulates private keys from all the nodes (tessellates 104) that showed up for generating a public key for attestation, upon initiation of the 'key generation and signing mechanism'.

At step 618, the tessellate 104(1) identifies if all the tessellates that showed up, provided the private keys. Upon identifying that all the tessellates did not provide the private keys, the process flow proceeds with step 608 followed by step 610, and then, the TSS process stops.

Alternatively, upon identifying that all the tessellates have provided the private keys, the process flow proceeds with step 620, at step 620, all the nodes (tessellates 104) on the first blockchain 108a attest the event data by the public key, and the 'key generation and signing mechanism' concludes followed by the completion of the TSS process.

Figure 7:
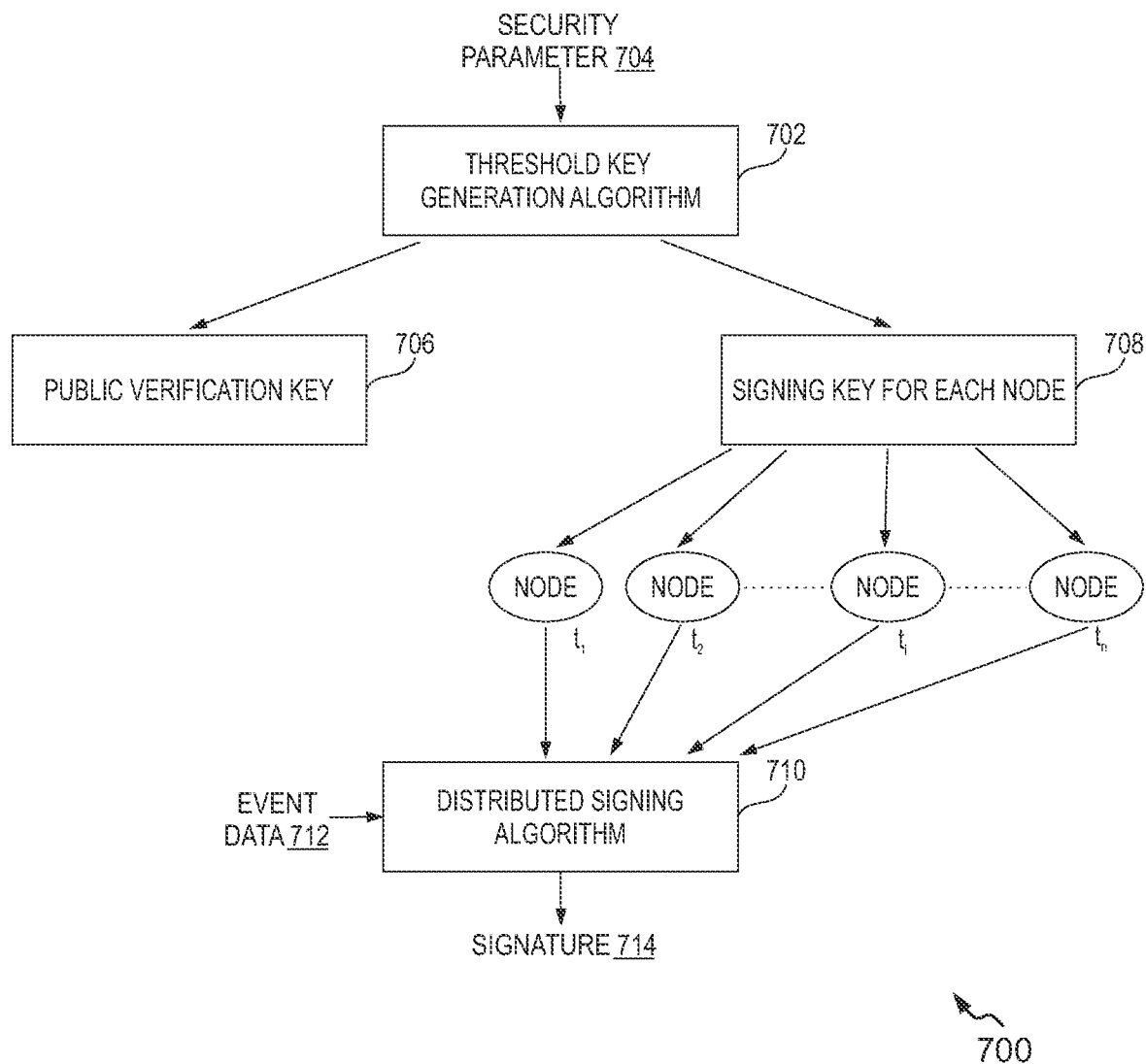
FIG. 7 depicts a simplified block diagram for representing a process flow of a key generation and signing mechanism in a TSS process, in accordance with an embodiment of the present disclosure.

FIG. 7 depicts a simplified block diagram for representing a process flow 700 of the key generation and signing mechanism in the TSS process, in accordance with an embodiment of the present disclosure. The key generation and signing mechanism may be implemented via multi-party computation (MPC) processes that reveal no private information of the participating tessellates 104. This allows the tessellates 104 to collectively and privately or secretly sign a transaction in the network 102. Further, the TSS process is essentially a t-out-of-n cryptosystem denoted by (t, n) where any subset of t+1 nodes can issue a valid signature to the transaction (event data), but any smaller subset cannot. Here, 'n' refers to any natural number greater than or equal to 1, and T is also any natural number but less than 'n'.

In an example scenario, the TSS process initially distributes signing power to a group of 'n' tessellates 104 or nodes such as $t_1, t_2, t_3, \ldots t_n$, such that any group of at least 't+1' nodes can jointly generate a valid signature, whereas a group of 't' nodes or fewer cannot. For example, the nodes $t_2$, $t_3, \ldots$, to are similar to the nodes 104(1), 104(2), ..., 104(n) of FIG. 1. Further, the TSS process implements the key generation and signing mechanism, wherein the key generation and signing mechanism may include two algorithms described as follows:

A threshold key generation algorithm 702: This is a distributed key generation function that takes 'λ' as a security parameter 704 and gives an output of a public verification key (pk) 706 and a signing key $(sk_i)$ 708 for each node. The signing key $(sk_i)$ is $t_i$'s share of the private key. Each node $t_i$ (where 'i' refers to any number between 1 to 'n') receives the public verification key (pk) 706 and the signing key $(sk_i)$ 708. The values $sk_1$, $sk_2$, $sk_3$, ... $sk_n$ constitute (t, n) TSS of the secret key sk.

A distributed signing algorithm 710: This algorithm takes the event data (m) 712 from external chains (not shown in FIG. 7 for sake of brevity) as a public input to be singed and a private input $(sk_i)$ from each node. Then, a signature $\overline{\omega} \in \{\square\square\square(\square\square, \square)\}$ 714 is generated.

Figure 8:
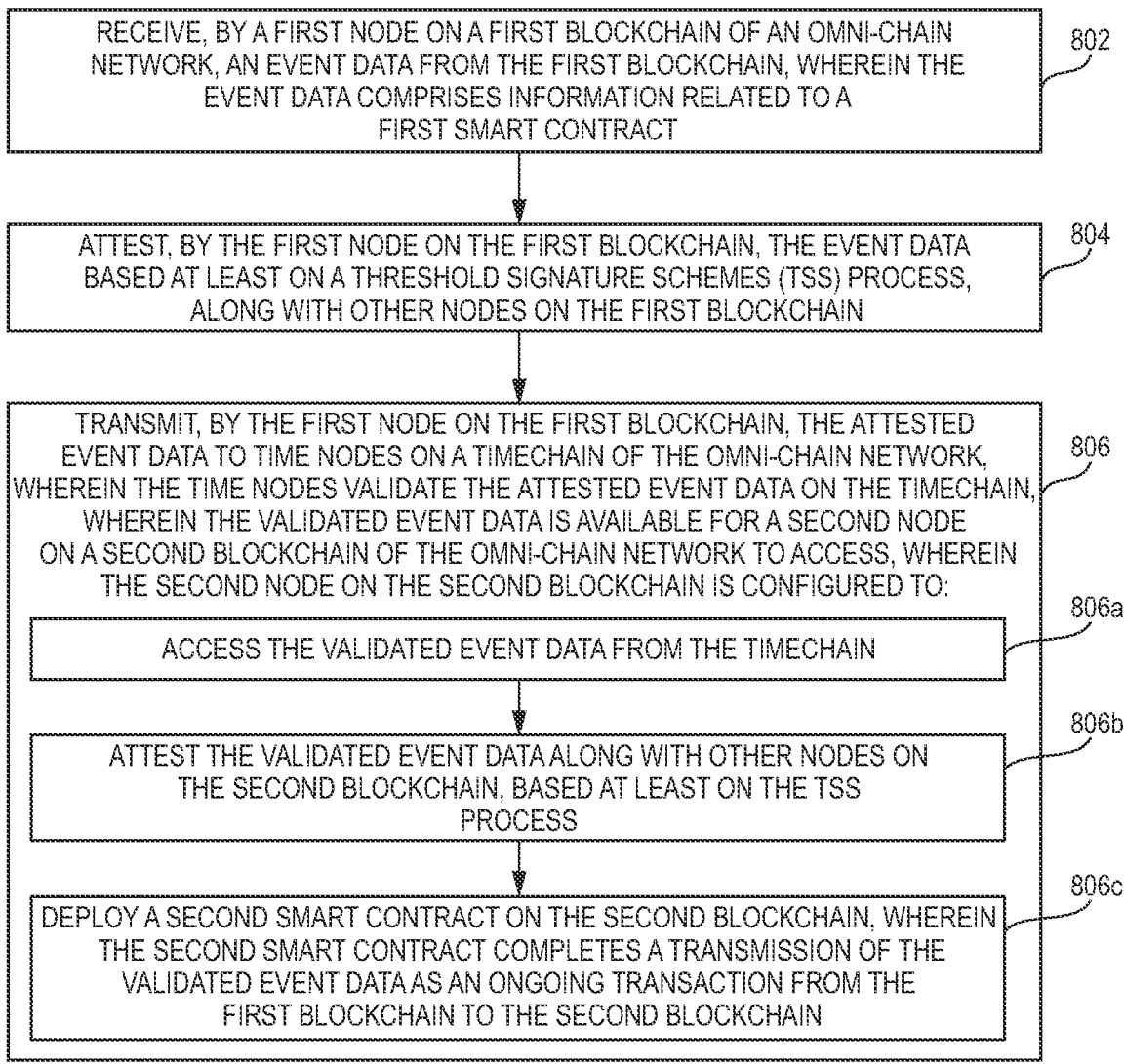
FIG. 8 is a flowchart illustrating a method for an omni-chain interoperability protocol in an omni-chain network, in accordance with an embodiment of the present disclosure.

FIG. 8 is a flowchart illustrating a method 800 for the omni-chain interoperability protocol in the omni-chain network 102, in accordance with an embodiment of the present disclosure. The method 800 depicted in the flow diagram may be executed by, for example, at least one server system. Operations of the flow diagram of the method 800, and combinations of operation in the flow diagram of the method 800, may be implemented by, for example, hardware, firmware, a processor, circuitry, and/or a different device associated with the execution of software that includes one or more computer program instructions. The method 800 starts at operation 802.

At 802, the method 800 includes receiving, by a first node 104(1) on a first blockchain 108a of an omni-chain network 102, an event data from the first blockchain 108a, wherein the event data includes information related to a first smart contract.

At 804, the method 800 includes attesting, by the first node 104(1) on the first blockchain 108a, the event data based at least on a Threshold Signature Schemes (TSS) process, along with other nodes on the first blockchain 108a.

At 806, the method 800 includes transmitting, by the first node 104(1) on the first blockchain 108a, the attested event data to time nodes 106 on a timechain 112 of the omni-chain network 102 wherein the time nodes validate the attested event data on the timechain 112. In an example, the validated event data is available for a second node on a second blockchain 110a of the omni-chain network to access. The second node on the second blockchain is configured to perform operations 806a to 806c.

At step 806a, the second blockchain is configured to access the validated event data from the timechain.

At step 806b, the second node is further configured to attest the validated event data along with other nodes on the second blockchain, based at least on the TSS process.

At step 806c, the second node is further configured to deploy a second smart contract on the second blockchain, wherein the second smart contract completes a transmission of the validated event data as an ongoing transaction from the first blockchain to the second blockchain.

Figure 9:
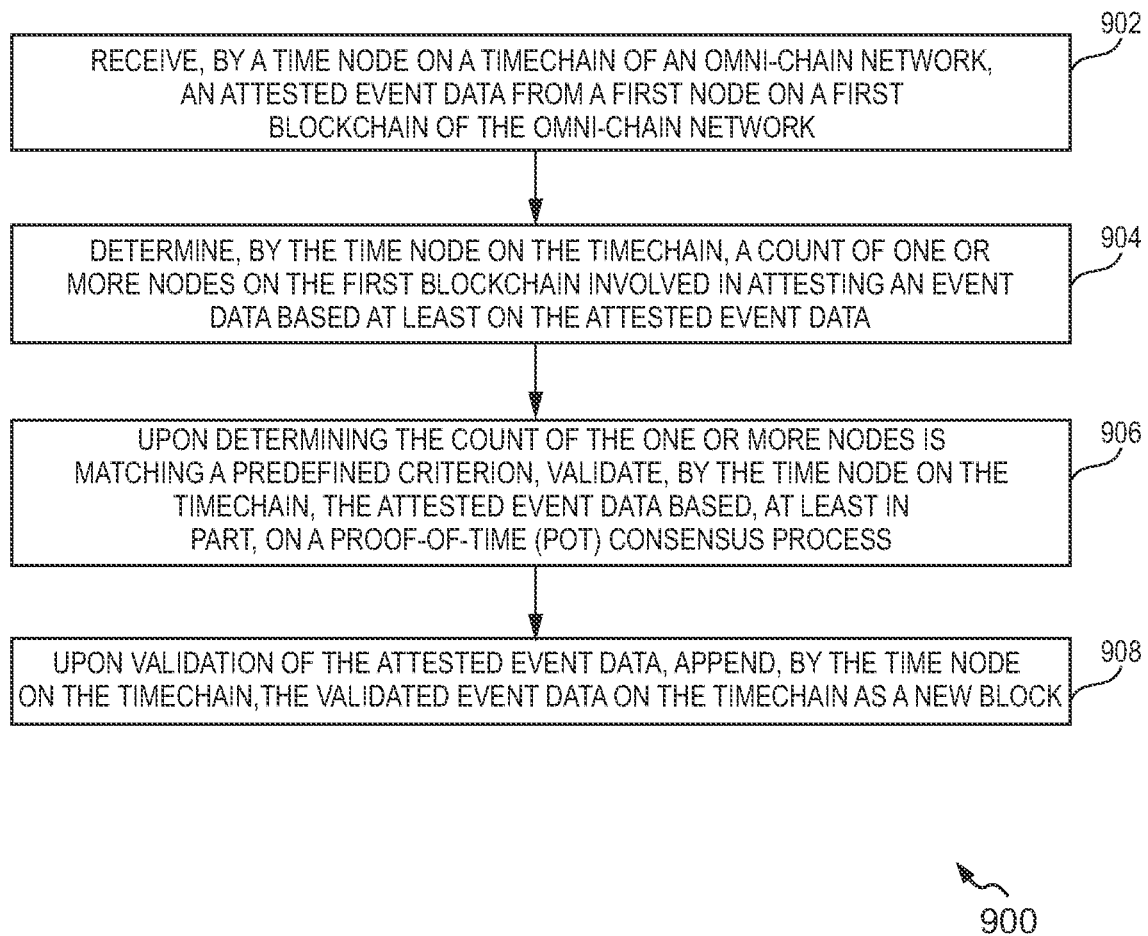
FIG. 9 is a flowchart illustrating a method for examining an attestation of the event data for running a decentralized consensus protocol in a time node, in accordance with an embodiment of the present disclosure.

FIG. 9 is a flowchart illustrating a method 900 for examining an attestation of the event data for running a decentralized consensus protocol in a time node, in accordance with an embodiment of the present disclosure. The method 900 depicted in the flow diagram may be executed by a time node say 106(1). Operations of the method 900 and a combination of operations in the flow diagram, may be implemented by, for example, hardware, firmware, a processor, circuitry, and/or a different device associated with the execution of software that includes one or more computer program instructions. The method 900 starts at operation 902.

At 902, the method 900 includes receiving, by a time node on a timechain of an omni-chain network, an attested event data from a first node on a first blockchain of the omni-chain network. In an example, the attested event data is to be transmitted as a transaction from the first blockchain to a second blockchain.

At 904, the method 900 includes determining, by the time node on the timechain, a count of one or more nodes on the first blockchain involved in attesting an event data based at least on the attested event data.

At 906, the method 900 includes upon determining the count of the one or more nodes matching a predefined criterion, validating, by the time node on the timechain, the attested event data based at least in part, on a Proof-of-Time (PoT) consensus process.

At 908, the method 900 includes upon validation of the attested event data, appending, by the time node on the timechain, the validated event data on the timechain as a new block.

The disclosed methods 800 and 900 may be implemented using software including computer-executable instructions stored on one or more computer-readable media (e.g., non-transitory computer-readable media, such as one or more optical media discs, volatile memory components (e.g., DRAM or SRAM)), or nonvolatile memory or storage components (e.g., hard drives or solid-state nonvolatile memory components, such as Flash memory components) and executed on a computer (e.g., any suitable computer, such as a laptop computer, net book, Web book, tablet computing device, smart phone, or other mobile computing devices). Such software may be executed, for example, on a single local computer or in a network environment (e.g., via the Internet, a wide-area network, a local-area network, a remote web-based server, a client-server network (such as a cloud computing network), or other such networks) using one or more network computers. Additionally, any of the intermediate or final data created and used during the implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software, and/or any combination of hardware, firmware, and/or software (for example, embodied in a machine-readable medium). For example, the apparatuses and methods may be embodied using transistors, logic gates, and electrical circuits (for example, application-specific integrated circuit (ASIC) circuitry and/or in Digital Signal Processor (DSP) circuitry).

Particularly, the node and its various components such as the computer system and the database may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or the computer to perform one or more operations. A computer-readable medium storing, embodying, or encoded with a computer program, or similar language may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer-readable media. Non-transitory computer-readable media include any type of tangible storage media. Examples of non-transitory computer-readable media include magnetic storage media (such as floppy disks, magnetic tapes, hard disk drives, etc.), optical magnetic storage media (e.g. magneto-optical disks), CD-ROM (compact disc read-only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer-readable media. Examples of transitory computer-readable media include electric signals, optical signals, and electromagnetic waves. Transitory computer-readable media can provide the program to a computer via a wired communication line (e.g., electric wires, and optical fibers) or a wireless communication line.

Various embodiments of the invention, as discussed above, may be practiced with steps and/or operations in a different order, and/or with hardware elements in configurations, which are different than those which are disclosed. Therefore, although the invention has been described based upon these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A computer-implemented method, comprising:
receiving, by a first node on a first blockchain of an omni-chain network, an event data from the first blockchain, wherein the event data comprises information related to a first smart contract;
attesting, by the first node on the first blockchain, the event data based at least on a Threshold Signature Schemes (TSS) process, along with other nodes on the first blockchain; and
transmitting, by the first node on the first blockchain, the attested event data to time nodes of the omni-chain network, wherein the time nodes validate the attested event data based on determining a count of nodes on the first blockchain that attest the event data, and append the validated event data as a block on a timechain of the omni-chain network, wherein the validated event data is available for a second node on a second blockchain of the omni-chain network to access from the timechain, wherein the second node on the second blockchain is configured to:
    access the validated event data from the timechain,
    attest the validated event data along with other nodes on the second blockchain, based at least on the TSS process, and
    deploy a second smart contract on the second blockchain, wherein the second smart contract completes a transmission of the validated event data as an ongoing transaction from the first blockchain to the second blockchain,
wherein the TSS process comprises:
    fetching, by the first node on the first blockchain, the event data;
    identifying, by the first node on the first blockchain, if a predetermined count of nodes have shown up for participating in a key generation and signing mechanism by running a join network scheme and waiting for the predetermined count of nodes to show up;
    upon identifying that the predetermined count of nodes has not shown up, triggering, by the first node and other nodes that showed up on the first blockchain, a slashing mechanism on nodes that failed to show up; and
    upon determining that the first node and the other nodes that showed up for participating in the key generation and signing mechanism quit based at least on the slashing mechanism, preventing, by the first node on the first blockchain, an initiation of the key generation and signing mechanism.

2. The computer-implemented method as claimed in claim 1, wherein the first smart contract and the second smart contract comprise transaction details comprising at least one of a first smart contract address, a second blockchain identity (ID), a second smart contract address associated with the second blockchain, tokens to transfer, a gas limit on the second blockchain, and a contract message (memo) for the transaction from the first blockchain to the second blockchain.

3. The computer-implemented method as claimed in claim 1, wherein the TSS process further comprises:
    upon identifying that the predetermined count of nodes has shown up, identifying, by the first node on the first blockchain, if the predetermined count is matching a predefined criterion;
    upon identifying that the predetermined count is not matching the predefined criterion, triggering, by the first node and other nodes that showed up on the first blockchain, the slashing mechanism on nodes that failed to show up; and
    preventing, by the first node on the first blockchain, the initiation of the key generation and signing mechanism when the first node and the other nodes that showed up for participating in the key generation and signing mechanism quit based at least on the slashing mechanism.

4. The computer-implemented method as claimed in claim 3, wherein the predefined criterion comprises a condition that the predetermined count of nodes that participate in the attestation of the event data is greater than 90 percent.

5. The computer-implemented method as claimed in claim 3, wherein the TSS process further comprises:
    upon identifying that the predetermined count is matching the predefined criterion, initiating, by the first node and the other nodes that showed up on the first blockchain, the key generation and signing mechanism;
    upon the initiation of the key generation and signing mechanism, accumulating, by the first node on the first blockchain, private keys from all the nodes that showed up for generating a public key for attestation;
    identifying, by the first node on the first blockchain, if all the nodes that showed up, provided the private keys;
    upon identifying that all the nodes that showed up did not provide the private keys, triggering, by the first node and other nodes that provided the private keys on the first blockchain, the slashing mechanism on nodes that failed to provide the private keys; and
    stopping, by the first node on the first blockchain, the key generation and signing mechanism when the first node and the other nodes that participated in the key generation and signing mechanism quit based at least on the slashing mechanism.

6. The computer-implemented method as claimed in claim 5, wherein the TSS process further comprises:
    upon identifying that all the nodes that showed up, provided the private keys, attesting, by all the nodes on the first blockchain, the event data by the public key; and upon attestation, by all the nodes on the first blockchain, concluding the key generation and signing mechanism and the TSS process.

7. The computer-implemented method as claimed in claim 6, wherein the key generation and signing mechanism comprises at least two algorithms comprising a threshold key generation algorithm and a distributed signing algorithm.

8. A first node for implementing an omni-chain protocol for enabling interoperability between heterogeneous blockchains in an omni-chain network, the first node comprising:
    a memory configured to store instructions;
    a communication interface; and
    a processor in communication with the memory and the communication interface, the processor configured to execute the instructions stored in the memory and thereby cause the first node to perform at least in part to:
receive an event data from a first blockchain, wherein the event data comprises information related to a first smart contract;
attest the event data based at least on a Threshold Signature Schemes (TSS) process, along with a supermajority of other nodes on the first blockchain; and
transmit the attested event data to time nodes of the omni-chain network for obtaining validated event data in response to meeting of a predefined criterion by a count of nodes on the first blockchain that attest the event data, wherein the time nodes validate the attested event data and append the validated event data as a block on a timechain of the omni-chain network, wherein the validated event data is available for a second node on a second blockchain of the omni-chain network to access from the timechain, wherein the second node on the second blockchain is configured to:
    access the validated event data from the timechain,
    attest the validated event data along with other nodes on the second blockchain, based at least on the TSS process, and
    deploy a second smart contract on the second blockchain, wherein the second smart contract completes a transmission of the validated event data as an ongoing transaction from the first blockchain to the second blockchain, wherein, to perform the TSS process, the first node is configured to:
   fetch the event data;
   identify if a predetermined count of nodes have shown up for participating in a key generation and signing mechanism by running a join network scheme and waiting for the predetermined count of nodes to show up;
   upon identifying that the predetermined count of nodes has not shown up, trigger a slashing mechanism on nodes that failed to show up; and
   upon determining that the first node and the other nodes that showed up for participating in the key generation and signing mechanism quit based at least on the slashing mechanism, prevent an initiation of the key generation and signing mechanism.

9. The node as claimed in claim 8, wherein the first smart contract and the second smart contract comprise transaction details comprising at least one of a first smart contract address, a second blockchain identity (ID), a second smart contract address associated with the second blockchain, tokens to transfer, a gas limit on the second blockchain, and a contract message (memo) for the transaction from the first blockchain to the second blockchain.

* * * * *